S. R. GILMORE.
APPARATUS FOR DRAWING TOGETHER SHIP PLATES.
APPLICATION FILED JAN. 17, 1919.

1,354,390.

Patented Sept. 28, 1920.

Inventor
Samuel R. Gilmore

By Mason Fenwick & Lawrence,
Attorneys

UNITED STATES PATENT OFFICE.

SAMUEL R. GILMORE, OF SEATTLE, WASHINGTON.

APPARATUS FOR DRAWING TOGETHER SHIP-PLATES.

1,354,390.  Specification of Letters Patent.  Patented Sept. 28, 1920.

Application filed January 17, 1919. Serial No. 271,731.

*To all whom it may concern:*

Be it known that I, SAMUEL R. GILMORE, a citizen of the United States, residing at 6814 Weedin Place, Seattle, in the county of King and State of Washington, have invented certain new and useful Improvements in Apparatus for Drawing Together Ship-Plates; and I do hereby declare the following to be a full, clear, and exact description of the invention, such as will enable others skilled in the art to which it appertains to make and use the same.

This invention relates to clamps, and particularly to clamps for drawing together steel plates for sides and parts of ships, and for drawing any two plates together when necessary to fasten the two together.

In building ships with steel plates great difficulty is found in bringing the ends of the plates close together so that rivets may be driven through each and the ends securely fastened. In common practice a great many men are used for doing such work with ordinary bolts and wrenches, and much time is lost by the slowness and inefficiency of such a method, and to overcome this difficulty I have invented a quick acting clamp comprising a pair of opposed clamping members, one of which is carried by a bolt adapted to be inserted through registering rivet holes in a pair of plates by a power multiplying device exerting its force through a thrust-resisting or abutment frame, on which the clamping members are mounted for quickly removing the abutments to exert their clamping force.

I have illustrated my device by drawings in which.

Like numerals as applied to the different figures represent like parts of the apparatus.

Figure 1:
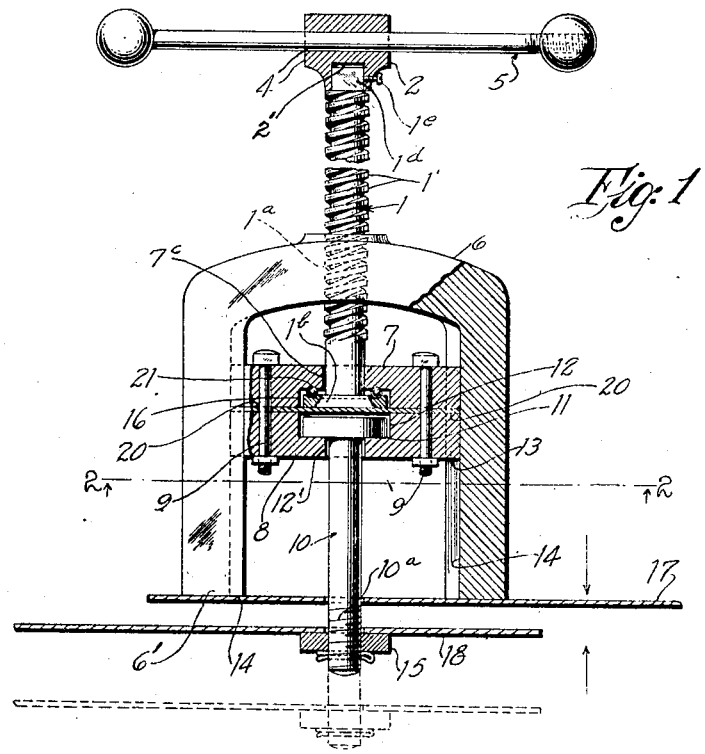
Figure 1 shows a side view of the apparatus.

1 is the main power screw, preferably provided with a square thread 1', and at the top of this screw is an enlarged portion 2 provided with one or more holes 4 through which sliding or other bars 5 may be used. The screw 1 which constitutes my power multiplying device passes through a thrust-resisting and clamp member supporting frame consisting of an inverted U-shaped frame 6, which is provided with an aperture and a square thread as $1^a$ to take screw 1. The ends 6' of the arms of the U-shaped frame constitute one clamp member. At the lower end of screw 1 is a head $1^b$ oppositely disposed to a bearing surface for this head in the counterbore 16 of a block 7 which extends between the arms of the U frame and is held in place against rotation by guides 14 on the inner faces of the arms. The block 7 has a hole $7^a$ through its center for the free passage and rotation of the screw shaft.

Below the block 7 rides a similar block 8 with a counterbore 12 and center hole 12'. Through the latter is passed a bolt 10 of suitable size to be passed through holes made in the ship plates 17 and 18, and a thread $10^a$ is provided on the outer end of bolt 10 on which a nut 15 constituting the other clamping member of my clamp may be turned when the end of bolt 10 has been passed through both plates, as 17 and 18. Bolt 10 is provided with a head 11, seated in counterbore 12. The counterbores in blocks 7 and 8 are cut in the sides of the blocks adjacent to each other, and the blocks are held together by bolts 9, 9. The hole 12' is made larger than the diameter of bolt 10 to permit of moving the bolt 10 to facilitate entering the bolt through the holes in the plates 17 and 18. The blocks 7 and 8 have their ends narrowed to permit the same to fit easily into the guideway or grooves 14. The counterbore in block 8 may be of such diameter and depth as will permit the heads 11 of the bolt 10 to fit loosely thereon, to permit slight movement therein. The enlarged part 2 may be connected to the top of screw 1 by having a square opening 2' into which the squared end $1^d$ may be inserted and held by a set screw $1^e$. Or a wrench may be applied directly to squared end $1^d$.

To lessen friction of the turning head $1^b$ of screw 1, a ball bearing may be provided against the block 7, as at 21, and a retaining plate 20 fastened across the head $1^b$ to prevent the balls escaping when the tension is released from the screw 1.

Figure 2:
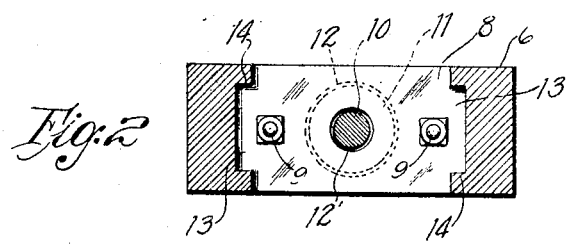
Fig. 2 is a sectional view taken on the line 2—2 of Fig. 1.

In the form of clamp shown in Figs. 1 and 2 the bolt 10 may be exchanged for another of any suitable diameter for the different sized holes provided in the ship plates by removing the nuts from bolt 9 and separating blocks 7 and 8, an ordinary stock bolt can be adapted for this use if occasion requires.

This device may be used for drawing boiler or any other plates together in same manner as the ship plates are acted upon.

Figure 3:
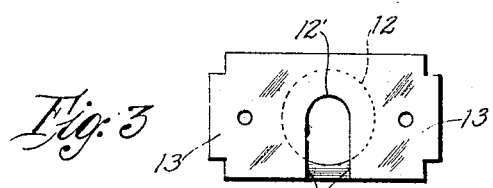
Fig. 3 shows another embodiment of a part shown in Fig. 2.

In Fig. 3 I show the block 8 with a slot cut in from one side to the center and counterbore, for the more ready interchange of bolts 10. In this form of the invention the frame may be moved endwise when pressure is released, and the bolt 10 thus detached.

In the use of the device the operator turns the screw 1 down until the bolt 10 is extended a sufficient length beyond the feet or legs of the U member to permit the outer end of the bolt to pass through any two sheets or plates, and the nut 15 is then placed over the outer plate 18, and power is applied to the lever passed through the eye or eyes 4 of the head piece 2, and the screw turned outward until the separated plates 17 and 18 have been drawn together.

In practice, it will generally be advisable to omit any fixed bar from the holes 4, as the same will cause trouble in contacting with other parts of the ship, etc., but the free ends of any bar may be inserted, where there is little turning space.

The arms or legs of the U member may be made of any length and the bolt 10 also, to permit of varying distances for drawing the plates.

By this device it will be noted, there is provided a firm bearing for the screw 1 in the part 6, while the drawing bolt 10 is loosely passed through hole 12' so that such side motion may be secured to provide for the varying directions that may be necessary to move it in connecting with the different offset holes in spaced plates.

I claim:—

1. In an apparatus for drawing together spaced objects, a U-shaped member, a power-screw threaded through the head of the U-shaped member and having means at the outer end thereof for turning the same, a draw-bolt having a swivel connection with the inner end of said power-screw and extending from the open end of said member, and detachable fastening means on the outer end of the draw-bolt.

2. In an apparatus for drawing together ship plates, a U-shaped member, a power-screw threaded through the head of the U-shaped member, a draw-bolt, blocks connecting the power-screw and draw-bolt, a nut and pin on the outer end of the draw-bolt, the blocks being slidably held by guides formed on the parallel sides of said member.

3. In an apparatus for clamping together bodies, a U-shaped member, a power-screw threaded through the head of the U-shaped member, a draw-bolt, blocks holding the heads of the screw and bolt relatively rotatably together, the blocks being slidably held by guides formed on the parallel arms of the U-shaped member, and balls between the head of the screw and its bearing block.

4. An apparatus for drawing spaced objects together, comprising an abutment frame having spaced clamping or abutment surfaces, a member slidably mounted thereon, a bolt connected to the slidable member and adapted to be connected to one of the objects and actuated to draw it toward another resting against the spaced clamping surfaces of the abutment frame, and means whereby force may be applied to the member slidably mounted in said abutment frame to cause it to slide thereon.

5. An apparatus for drawing spaced objects together, comprising an abutment frame having a clamping surface, a member mounted to slide thereon, and means mounted on said slidable member to be connected to one of the objects and actuated to draw it toward another resting against the abutment frame, said means including a bolt mounted to have free lateral movement within a limited range, and adapted to be passed through holes in the objects.

In testimony whereof I affix my signature.

SAMUEL R. GILMORE.